United States Patent
Bowe et al.

(10) Patent No.: US 7,011,101 B2
(45) Date of Patent: Mar. 14, 2006

(54) VALVE SYSTEM

(75) Inventors: Michael Joseph Bowe, Preston (GB); John William Stairmand, Chester (GB); Richard Samuel Mills, Knutsford (GB)

(73) Assignee: Accentus PLC, Didcot (GB)

( * ) Notice: Subject to any disclaimer, the term of this patent is extended or adjusted under 35 U.S.C. 154(b) by 0 days.

(21) Appl. No.: 10/514,810

(22) PCT Filed: May 13, 2003

(86) PCT No.: PCT/GB03/02034

§ 371 (c)(1),
(2), (4) Date: Dec. 15, 2004

(87) PCT Pub. No.: WO03/098053

PCT Pub. Date: Nov. 27, 2003

(65) Prior Publication Data

US 2005/0173009 A1 Aug. 11, 2005

(30) Foreign Application Priority Data

May 17, 2002 (GB) .................................. 0211314

(51) Int. Cl.
*F17D 1/18* (2006.01)
*F15C 1/16* (2006.01)

(52) U.S. Cl. ........................ 137/14; 137/808; 137/810; 137/812; 137/813

(58) Field of Classification Search ................ 137/808, 137/810, 812, 813, 14
See application file for complete search history.

(56) References Cited

U.S. PATENT DOCUMENTS

| | | | |
|---|---|---|---|
| 3,511,257 A | * | 5/1970 | Chow .......................... 137/813 |
| 3,545,468 A | | 12/1970 | Freeman ..................... 137/81.5 |
| 3,674,044 A | | 7/1972 | Mayer ........................ 137/81.5 |
| 3,756,285 A | | 9/1973 | Johnson ...................... 137/810 |
| 4,632,107 A | * | 12/1986 | Butler ...................... 128/204.24 |
| 5,365,962 A | * | 11/1994 | Taylor ......................... 137/14 |
| 5,617,896 A | * | 4/1997 | Tornberg et al. ............ 137/813 |

FOREIGN PATENT DOCUMENTS

| | | |
|---|---|---|
| EP | 0305163 | 3/1989 |
| GB | 1193089 | 5/1970 |
| JP | 1048920 | 2/1989 |
| WO | 02/084154 | 10/2002 |

* cited by examiner

Primary Examiner—A. Michael Chambers
(74) Attorney, Agent, or Firm—William H. Holt

(57) ABSTRACT

A valve system (10) controls the fluid flow between an inlet (12) and an outlet (14). The system (10) splits the flow into two parallel flow ducts (15, 16) and recombines the flows through opposed tangential inlets (18) and (19) of a fluidic vortex valve (20) which has an axial outlet (22). An adjustable valve (24) controls the flow through one of the parallel flow ducts (15), controlling the strength of the vortex generated within the vortex valve (20). Hence a small valve (24) can control and adjust the flows in both ducts (15 and 16).

6 Claims, 2 Drawing Sheets

VALVE SYSTEM

This invention relates to a valve system and a method for adjusting flow rate or pressure, particularly but not exclusively for maintaining a desired pressure in a pipeline carrying a liquid.

There are many situations in which it is necessary to adjust the flow rate through a pipe, so that a liquid emerges at a desired pressure, or at a desired rate. This adjustment may be carried out with a mechanical valve such as a gate valve, and the adjustment may be performed in response to signals from an instrument measuring the pressure or flow rate at the outlet. The larger the flow rate that is to be controlled, the larger must be the valve orifice (when fully open), and it would be desirable if a pressure drop could be generated using a smaller valve.

According to the present invention there is provided a pressure-controlling valve system having an inlet and an outlet for a flowing liquid, the system comprising two parallel flow ducts for the liquid, and a fluidic vortex valve comprising a generally cylindrical chamber with at least one pair of opposed tangential inlets and an axial outlet, the flow ducts communicating between the inlet and two opposed tangential inlets to the fluidic vortex valve, the axial outlet of the fluidic vortex valve communicating with the outlet of the valve system, and with an adjustable valve to adjust the flow through one of the parallel flow ducts.

The invention also provides a method of controlling a flowing liquid with such a valve system, by adjusting the adjustable valve.

The parallel flow ducts may be each arranged to carry half the total flow, so that the adjustable valve need only be large enough to carry half the flow. If the flows through the two opposed tangential inlets are equal (in both flow rate and area) then the fluid will flow radially through the chamber to emerge through the axial outlet, and the fluidic vortex valve will impose the minimum pressure drop. If the adjustable valve is adjusted to reduce the flow through the one duct, a vortex will be generated in the chamber, so that the pressure drop across the fluidic vortex valve will increase. If the adjustable valve is closed, then there will be a vigorous vortex in the chamber, and the pressure drop across the fluidic vortex valve will be at its maximum.

The adjustable valve may be a conventional mechanical valve, such as a gate valve or a sleeve valve. Alternatively and preferably it may combine a fluidic vortex valve (with a non-tangential inlet, at least one generally tangential inlet, and an axial outlet) with a mechanical valve, such that the flow can be closed off completely, for example as described in WO 02/084154.

The parallel flow ducts may alternatively carry unequal portions of the total flow (when the adjustable valve is fully open). For example the duct in which there is the adjustable valve may be of smaller cross-section than the other duct, but the other duct may comprise a fixed flow restrictor, so that the flows through the opposed tangential inlets to the fluidic vortex valve are of substantially equal and opposite momentum, so that the resulting flow is radial and generates the minimum pressure drop across the fluidic vortex valve. In another alternative, where a significant pressure drop is always required across the valve system, the duct in which there is the adjustable valve may be of smaller cross-section than the other duct, so that even with the adjustable valve fully open there is a vortex generated within the fluidic valve; nevertheless, as the flow through the adjustable valve is reduced, the strength of the vortex flow within the fluidic valve will increase and the resulting pressure drop will increase.

The invention will now be further and more particularly described, by way of example only, and with reference to the accompanying drawings in which.

Figure 1:
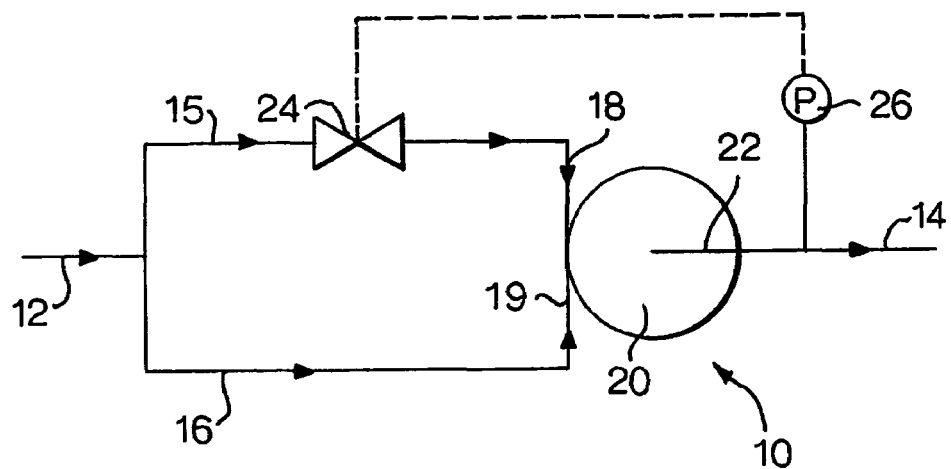
FIG. 1 shows a flow diagram of the valve system of the invention.

Referring to FIG. 1 there is shown a valve system 10 for use in a water supply network, the system 10 having an inlet 12 to which water is supplied and an outlet 14 from which water emerges. The water supplied to the inlet 12 may vary in pressure, but it is desirable if the outlet pressure can be maintained at a discharge head of 40 m of water (400 kPa). The valve system 10 has two parallel ducts 15 and 16 that communicate with the inlet 12, and at their other ends communicate with opposed tangential inlets 18 and 19 to a fluidic vortex valve 20. Water leaves the fluidic vortex valve 20 through an axial outlet port 22 to emerge through the outlet 14. There is an adjustable valve 24 in the duct 15. A pressure sensor 25 is arranged to measure the pressure at the outlet 14, and to provide control signals to the adjustable valve 24.

For minimum pressure drop the adjustable valve 24 is fully opened, and the flows through the tangential inlet 18 and 19 are equal (but opposite). Consequently there is no vortex created in the fluidic valve 20, and the water flows through radially with little pressure drop. When a pressure drop is required, the adjustable valve 24 is partially closed, reducing the flow through the tangential inlet 18. Because of the difference between the flows through the inlets 18 and 19 a vortex forms within the fluidic valve 20, so the pressure drop across the fluidic valve 20 increases. If the adjustable valve 24 is completely closed, the vortex within the fluidic valve 20 is of maximum strength, and the overall pressure drop is consequently at its maximum.

Figure 2:
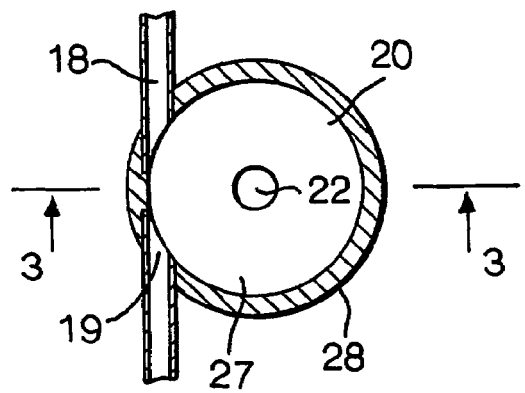
FIG. 2 shows a transverse sectional view through the fluidic vortex valve of the system of FIG. 1.
Figure 3:
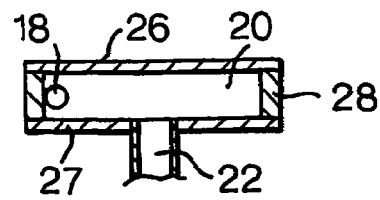
FIG. 3 shows a longitudinal sectional view on the line 3—3 of FIG. 2.

In FIG. 1 the fluidic vortex valve 20 is shown diagrammatically. Referring now to FIGS. 2 and 3, the valve 20 comprises a cylindrical chamber defined between a circular top plate 26, a circular base plate 27, and a cylindrical wall 28, the circular base plate 27 defining the axial outlet port 22 at its centre. The tangential inlets 18 and 19 communicate tangentially with the chamber, but in opposite directions. The pressure drop across the fluidic vortex valve 20 when there is a vortex in the chamber is due to the vortex itself, and so the valve 20 suffers significantly less wear than would a mechanical valve introducing the same pressure drop. There are no baffles within the chamber to restrict or impede the fluid flow.

It should be appreciated that the fluidic vortex valve 20 may be modified in various ways while still being suitable for the present invention. The proportions of the chamber may be different from that shown in the figures, the inlet ducts 18 and 19 may differ in cross sectional area, and the outlet port 22 might have a tapering portion, rather than the abrupt transition to the diameter of the outlet duct shown in FIG. 3. It will also be appreciated that the size and proportions of the valve 20 will depend upon the required flow rate, and the required pressure drop that it is to generate.

Figure 4:
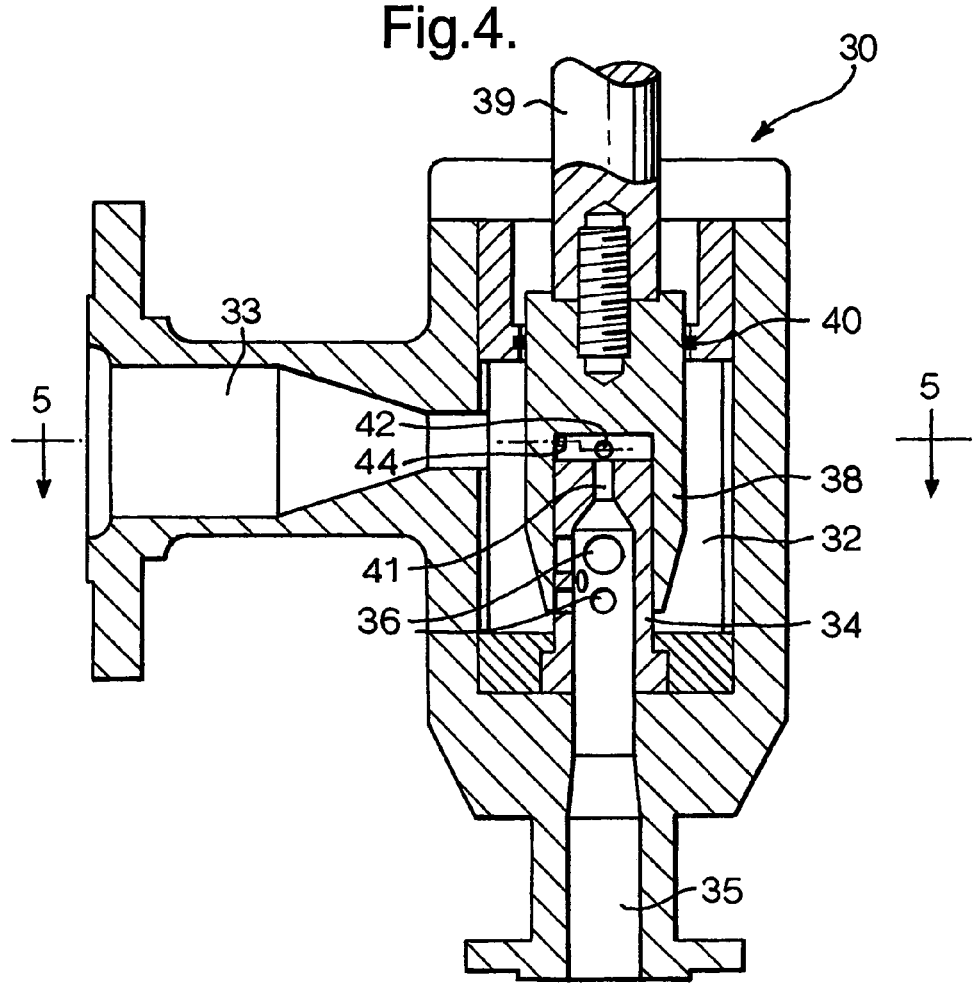
FIG. 4 shows a longitudinal sectional view of a valve for use as the adjustable valve of the system of FIG. 1.

The adjustable valve 24 may be any type of mechanical valve, such as a gate valve, a slide valve, a globe valve, or a plunger valve. Alternatively it may comprise both a mechanical valve and a fluidic vortex valve. For example, referring to FIG. 4, there is shown a sectional view of a valve assembly 30 suitable for use as the adjustable valve 24, and which combines a sleeve valve with a fluidic vortex. The valve assembly 30 comprises a valve chamber 32 of substantially cylindrical shape and which communicates on one side with an inlet supply port 33 for water from the duct 15. A valve tube 34 projects from one end wall of the valve chamber 32, and communicates with an outlet duct 35; the valve tube 34 defines a plurality of radial apertures 36 through its walls. A valve sleeve 38 closed at its top end (as shown) fits over the valve tube 34 and can be moved axially by a hydraulic actuator (not shown) by means of a valve stem 39, passing through a seal 40 at the other end wall of the valve chamber 32. Movement of the valve stem 39 consequently controls the degree to which the apertures 36 are obstructed, and so controls the flow of the water passing along the duct 15 between the inlet supply port 33 and the outlet duct 35. These features are substantially conventional.

Figure 5:
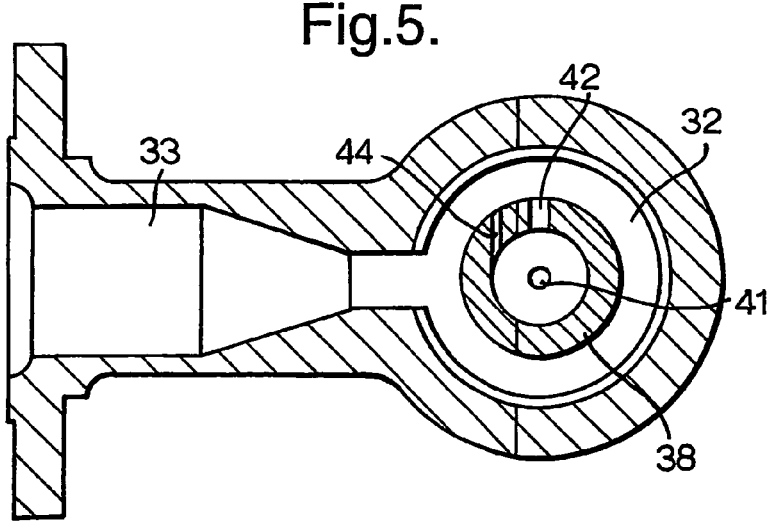
FIG. 5 shows a sectional view on the line 5—5 of FIG. 4.

The valve tube 34 is partly closed at its top end (as shown) but defines an axial port 41 communicating with the space between the top of the tube 34 and the top of the sleeve 38. The sleeve 38 defines a radial aperture 42 a short distance below the closed end, and also defines a tangential aperture 44 adjacent to the closed end. The radial aperture 42 is of larger diameter than the tangential aperture 44, and is located such that when the sleeve 38 is raised so that the tangential aperture is just fully open, a large portion of the radial aperture remains occluded by the sleeve 38. The orientations of the apertures 42 and 44 are shown more clearly in FIG. 5 but it is emphasized that the apertures 42 and 44 are not in the same radial plane. The cylindrical space defined between the top of the tube 34 and the closed end of the sleeve 38 thus defines a vortex chamber.

When the valve assembly 30 is fully open, with the valve sleeve 38 exposing all the apertures 36, the liquid flow is maximum. During operation, if the valve sleeve 38 is moved down it gradually obstructs flow through the apertures 36 and so decreases the fluid flow. In the position as shown, all the apertures 36 are closed, so fluid flow is primarily through the radial aperture 42 through the sleeve 38. Further movement of the sleeve 38 gradually closes the radial aperture 42 and consequently increases the proportion of the flow that passes through the tangential aperture 44, setting up more vigorous vortex flow in the vortex chamber and so increasing the pressure drop across the valve assembly 30. Further movement of the sleeve 38 completely closes the radial aperture 42, so that only tangential (and therefore vortex) flow occurs, therefore providing a significantly greater pressure drop than a plain orifice of equivalent hydraulic diameter. Finally, further movement of the sleeve 38 closes off the flow altogether.

In a modified valve system, the inlet flow 12 is split into three parallel flows, which are again recombined in a fluidic vortex valve 20. As described in relation to FIGS. 1–3, two of the flows are introduced into the vortex valve along opposed tangential paths, but in this case the third parallel flow is introduced into the vortex valve along a radial path, entering the chamber on the opposite side. This system operates in substantially the same way as described above, although having a different variation of overall pressure drop with the position of the adjustable valve 24. Furthermore this system enables an even smaller valve 24 to be used, as it must carry only a third of the total flow (if all the parallel flows are equal).

It will be appreciated that the valve system 10 may form an integrated valve unit, or alternatively may consist of the adjustable valve 24 and the fluidic valve 20 as separate components linked by pipes.

What is claimed is:

1. A method of controlling a flowing liquid, wherein the liquid is caused to flow through a valve system between an inlet and an outlet thereof, the valve system comprising two parallel flow ducts, and a fluidic vortex valve comprising a generally cylindrical chamber with at least one pair of opposed tangential inlets and an axial outlet, the flow ducts communicating exclusively between the inlet and two opposed tangential inlets to the fluidic vortex valve, the axial outlet of the fluidic vortex valve communicating with the outlet of the valve system, and with an adjustable valve to adjust the flow through one of the parallel flow ducts, the adjustable valve enabling the flow therethrough to be closed off completely, and wherein the adjustable valve is adjusted in response to a measured value of the pressure of the liquid, for controlling the flowing liquid and maintaining the outlet pressure from the valve system at a desired value.

2. A method as claimed in claim 1 wherein the adjustable valve combines a fluidic vortex valve with a non-tangential inlet, at least one generally tangential inlet, and an axial outlet, with a mechanical valve such that the flow through the adjustable valve can be closed off completely.

3. A pressure-controlling valve system having an inlet and an outlet for a flowing liquid, the system comprising two parallel flow ducts for the liquid, and a fluidic vortex valve comprising a generally cylindrical chamber with at least one pair of opposed tangential inlets and an axial outlet, said flow ducts communicating exclusively between said inlet and two opposed tangential inlets to the fluidic vortex valve, said axial outlet of the fluidic vortex valve communicating with said outlet of the valve system, and with an adjustable valve for adjusting the flow through one of said parallel flow ducts, the adjustable valve enabling the flow therethrough to be closed off completely, and means for sensing the pressure of the liquid and for adjusting said adjustable valve in response to the measured pressure for maintaining the pressure at said outlet of the valve system at a desired value.

4. A valve system as claimed in claim 3 wherein said parallel flow ducts are arranged to carry equal flows.

5. A valve system as claimed in claim 3 wherein the adjustable valve combines a fluidic vortex valve with a non-tangential inlet, at least one generally tangential inlet, and an axial outlet, with a mechanical valve such that the flow can be closed off completely.

6. A valve system as claimed in claim 4 wherein the adjustable valve combines a fluidic vortex valve with a non-tangential inlet, at least one generally tangential inlet, and an axial outlet, with a mechanical valve such that the flow can be closed off completely.

* * * * *